United States Patent Office 3,468,655

Patented Sept. 23, 1969

1

2

3,468,655

METHOD OF APPLYING HERBICIDAL IMIDATES

Kenneth L. Viste, Warminster, Pa., assignor to Rohm & Haas Company, Philadelphia, Pa., a corporation of Delaware No Drawing. Filed Jan. 20, 1966, Ser. No. 521,822
Int. Cl. A01m 9/12, 9/20, 17/00
U.S. Cl. 71—121 9 Claims

ABSTRACT OF THE DISCLOSURE

Disclosed herein is a method of applying liquid herbicidal compounds of the formula

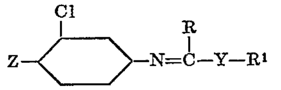

wherein R is alkyl of 1 to 6 carbon atoms,
$R^1$ is phenyl, methylphenyl, mono-, di- or trichlorophenyl, methylchlorophenyl or alkoxyphenyl wherein the alkoxy group has up to 5 carbon atoms,
Z is methyl or chloro, and
Y is oxygen or sulfur.

These compounds are sprayed in their undiluted liquid form onto a locus containing undesired plants wherein the spray comprises drops of a substantially uniform size up to about 500 microns in diameter.

This invention deals with a novel method for the application of herbicidal compounds. More particularly, this invention relates to the application of undiluted liquid herbicidal imidates of the formula

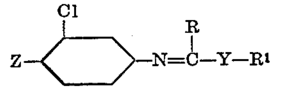

(I)

wherein

R is alkyl of 1 to 6 carbon atoms,
$R^1$ is phenyl, methylphenyl, mono-, di- or trichlorophenyl, methylchlorophenyl or alkoxyphenyl wherein the alkoxy group has up to 5 carbon atoms,
Z is methyl or chloro, and
Y is oxygen or sulfur.

Typically, R represents methyl, ethyl, propyl, isopropyl, butyl, 2-methylbutyl, sec-pentyl, 1,1-dimethylbutyl, hexyl or 2-methylpentyl.

Typically, $R^1$ represents phenyl, 4-methylphenyl, 4-chlorophenyl, 3,4-dichlorophenyl, 2,4,5-trichlorophenyl, 2-methyl-4-chlorophenyl or 4-methoxyphenyl.

It is well known in the art that herbicides are generally applied to the desired plants in the form of granules, sprays or dusts. The active agent in said spray or solid formulation is usually a minor proportion of the total product applied, whereas the major proportion is made up of a carrier, such as water, inert organic solvent, solid or other agronomically suitable materials. Of course, this method of application results in substantial economic waste, that is, the carrier in which the herbicides are incorporated normally serves no valuable agricultural purpose other than providing a medium in which the herbicide may be deposited on the plant. Therefore, a great deal of material, that is, the carrier, is simply wasted. In addition, the expense involved in transporting and delivering the herbicidal mixtures to the plants is greatly increased because of the magnitude of the material involved. Where airplane application is contemplated, the volume and weight of the material to be applied is particularly critical. Because of this criticality, there has been a constant search for methods in which the weight and bulk required to spray any particular acreage could be reduced. The present invention provides just such a breakthrough in the method of applying herbicides. Said invention provides for the first time a novel, low-volume method of herbicidal application while still obtaining very high herbicidal activity.

Recently, there has been a substantial amount of experimentation with regard to the low-volume application of insecticides. The state of the art in this respect is evidenced by the following publications:

Agricultural Chemicals, pp. 69–70, June 1965, Chemical Week, pp. 59–60, January 1965, Farm Technology, pp. 9–10, April 1965, and Mississippi Farmer, "A 'New' Method of Applying Insecticides," June 1963.

These publications describe in some detail the procedures and equipment used in the successful low volume application of malathion LV, a liquid insecticide produced by the American Cyanamid Company.

It is an object of this invention to provide a method of applying particular herbicidal compounds.

It is a further object of this invention to improve the herbicidal effectiveness of particular compounds.

Another object of this invention is the improvement of resistance to loss of herbicidal activity by rainfall after treatment.

Other objects of this invention will be evident upon further reading of this disclosure.

Typical liquid imidates which are particularly valuable for the control of weeds when applied by the method of this invention are:

Phenyl N-(3,4-dichlorophenyl)propionimidate,
4-methoxyphenyl N-(3,4-dichlorophenyl)propionimidate,
2,4,5-trichlorophenyl N-(3,4-dichlorophenyl)propionimidate,
Phenyl N-(3,4-dichlorophenyl)isobutyrimidate,
p-Methoxyphenyl N-(3,4-dichlorophenyl)isobutyrimidate,
2,4-dichlorophenyl N-(3,4-dichlorophenyl)isobutyrimidate,
2-methyl-4-chlorophenyl N-(3,4-dichlorophenyl)isobutyrimidate,
Phenyl N-(3,4-dichlorophenyl)thioisobutyrimidate,
Phenyl N-(3-chloro-4-methylphenyl)-α-methylvalerimidate,
p-Tolyl N-(3,4-dichlorophenyl)-α-methylvalerimidate,
3,4-dichlorophenyl N-(3,4-dichlorophenyl)-α-methylvalerimidate, and
Phenyl N-(3,4-dichlorophenyl)-α,α-dimethylvalerimidate.

Details of their preparation and herbicidal activity are disclosed in United States patent application Ser. No. 521,821, filed on even date herewith. Said compounds have exhibited excellent herbicidal activity when applied to plants in the normal or usual manner, that is, in a spray consisting of the above compounds in a sutiable formulation. However, surprising results were obtained when said compounds were applied to the plants in their undiluted liquid form. Whereas one might expect that the herbicidal activity would decrease under such conditions, on the contrary, the activity greatly increased. Not only did the undiluted compounds of the present invention surpass their own activity when applied in the normal diluted form, but they showed even better herbicidal activity than that of a well known commercial herbicide; namely, 3,4-dichloropropionanilide, which is described in British Patent No. 903,766.

The novel method of this invention involves the application of the compounds of Formula I to the plants to be treated.

Said compounds are applied neat or in their undiluted liquid form. For the sake of this invention, the terms "undiluted," "low volume" and "neat" are used interchangeably to denote that the compound is in its natural or technical state as made in contradistinction to the compound being incorporated in one or more adjuvants. In addition to applying the compounds of Formula I to the plants in their undiluted liquid form, it is also necessary, in order to accomplish the objectives of this invention, that such application consist of liquid drops of generally uniform size, in the range of up to about 500 microns in diameter. Reasonably uniform drops of about 100 to 300 microns are preferable.

The amount of the compound which will be herbicidally effective when applied according to this invention will depend, of course, on the nature of the plants to be treated, the weather and other variables normally encountered in such operations. Generally, an application rate of about ¼ to 10 pounds of herbicide per acre will prove to be satisfactory. The actual amount to be used can easily be determined by one skilled in the art.

The delivery system used in this invention can be either ground or air type. The only requisite of such system is that it be adaptable for applying the compounds of Formula I to plants in low volume and in drops of generally uniform size and within the stated range.

The herbicidal effectiveness of this unique method of application was demonstrated by the use of a standard method of comparison. Certain crops and weeds were grown in pots. After the seeds germinated and the seedlings developed, the resulting plants were treated with the various herbicides. The treatment took place about two weeks after the seeds were planted. The percent phytotoxicity or injury was observed at regular intervals thereafter and recorded. Table I details the results of these tests.

Imidates applied by the method of this invention may be considered as precursors of the herbicidally effective 3,4-disubstituted anilides. For this reason, typical imidates, such as phenyl N-(3,4-dichlorophenyl)propionimidate and 4-methoxyphenyl N-(3,4-dichlorophenyl)propionimidate, were compared as disclosed in Tables I, II and III with 3,4-dichloropropionanilide on a basis of molar equivalency.

An observation of 0% would indicate that there was no effect on the plant and an observation of 100% would indicate a complete kill of the particular plant in question. Of course, observations between 0 and 100% would indicate such proportional injury.

It should also be noted that in recent years there has been a growing tendency to use the term "phytotoxicity" only when referring to injury evident in agronomic crops and not in reference to weeds. Such terms as "kill" or "control" are more appropriately used when referring to the injury evident in weeds. Of course, the term "injury" may be used when dealing with either agronomic crops or weeds.

Table I shows very clearly that the weed killing ability of the imidates is greatly increased when they are applied to the plants to be treated in their undiluted liquid state in the manner of this invention. As for example, at a level of 3 pounds per acre of phenyl N-(3,4-dichlorophenyl)propionimidate, there is recorded a 63% injury of barnyard grass after 14 days from the date of treatment using a normal high volume spray, that is, 50 gallons per acre. However, when the same compound is sprayed at the same dosage using the method of this invention, there is a 100% kill of barnyard grass after an equivalent lapse of time. These results are even more surprising when you consider the effect of the 3,4-dichloropropionanilide on the barnyard grass at a level of 3 pounds per acre. An injury of 87% after 14 days is obtained when this commercial herbicide is applied as a spray at the normal high volume level, whereas an injury of only 77% is obtained when the same compound is applied using the general method of this invention.

It is, of course, well known that the commercial herbicide, 3,4-dichloropropionanilide, is highly selective. For this reason, it proves extremely useful for weed control in rice since it does not injure the rice to any appreciable extent while killing the surrounding weeds. Similar crop selectivity is also evident in the various imidates used in this invention. Therefore, it is especially important that this selectivity not be changed as a result of the method of application. A standard test using rice was run by the method previously described. The data are presented in Table II.

TABLE II

| Compound | Lbs./acre | Percent phytotoxicity of rice (*Oryza sativa*) | | | | | |
|---|---|---|---|---|---|---|---|
| | | High volume [1] | | | Low volume [2] | | |
| | | Days after application | | | | | |
| | | 3 | 7 | 14 | 3 | 7 | 14 |
| Phenyl N-(3,4-dichlorophenyl)-propionimidate | [3] 1.5 | 0 | 0 | 0 | 13 | 27 | 17 |
| | [3] 3.0 | 20 | 20 | 3 | 17 | 23 | 20 |
| | [3] 6.0 | 30 | 30 | 20 | 20 | 43 | 30 |
| 3,4-dichloropropionanilide | 1.5 | 0 | 0 | 17 | 7 | 13 | 7 |
| | 3.0 | 16 | 13 | 20 | 23 | 17 | 13 |
| | 6.0 | 10 | 33 | 30 | --- | --- | --- |

[1] Application by spraying of an acetone solution at the rate of 50 gallons per acre.
[2] Application of the herbicide in its undiluted liquid state using equipment suitable for obtaining uniform drop size. In the case of the 3,4-dichloropropionanilide, a water emulsion made from a commercial emulsifiable concentrate was sprayed at the rate of 10 gallons per acre using the same equipment.
[3] Based on the molar equivalency of 3,4-dichloropropionanilide.

Table II shows very clearly that this selectivity is not decreased to any extent by reason of this invention. At a level of 3 pounds per acre of phenyl N-(3,4-dichlorophenyl)propionimidate, there is a 20% injury to rice after 14 days when applied by the method of this invention. Likewise, when the 3,4-dichloropropionanilide is applied

TABLE I

| Compound | Lbs./acre | Percent Injury on Barnyard Grass (*Echinochloa crusgalli*) | | | | | | Percent Injury on Flax (*Linum usitatissimum*) | | | | | |
|---|---|---|---|---|---|---|---|---|---|---|---|---|---|
| | | High Volume [1] | | | Low Volume [2] | | | High Volume [1] | | | Low Volume [2] | | |
| | | Days After Application | | | | | | Days After Application | | | | | |
| | | 3 | 7 | 14 | 3 | 7 | 14 | 3 | 7 | 14 | 3 | 7 | 14 |
| Phenyl N-(3,4-dichlorophenyl)propionimidate | [3] 1.5 | 40 | 40 | 40 | 47 | 77 | 80 | 20 | 20 | 13 | 73 | 80 | 77 |
| | [3] 3.0 | 50 | 60 | 63 | 57 | 87 | 100 | 37 | 40 | 37 | 73 | 77 | 63 |
| | [3] 6.0 | 50 | 70 | 70 | 80 | 90 | 100 | 70 | 70 | 60 | 73 | 90 | 90 |
| 4-methoxyphenyl N-(3,4-dichlorophenyl)propionimidate | [3] 1.5 | 50 | 60 | 60 | 43 | 70 | 70 | --- | --- | --- | --- | --- | --- |
| | [3] 3.0 | 50 | 77 | 80 | 47 | 87 | 92 | --- | --- | --- | --- | --- | --- |
| 3,4-dichloropropionanilide | 1.5 | 30 | 67 | 73 | 37 | 53 | 57 | --- | --- | --- | --- | --- | --- |
| | 3.0 | 50 | 87 | 87 | 33 | 90 | 77 | 53 | 60 | 57 | 20 | 50 | 47 |

[1] Application by spraying of an acetone solution at the rate of 50 gallons per acre.
[2] Application of the herbicide in its undiluted liquid state using equipment suitable for obtaining uniform drop size. In the case of the 3,4-dichloropropionanilide, a water emulsion made from a commercial emulsifiable concentrate was sprayed at the rate of 10 gallons per acre using the same equipment.
[3] Based on the molar equivalency of 3,4-dichloropropionanilide.

at the same level of concentration using a normal high volume spray, there is a 20% injury to rice after 14 days. In both cases the rice recovers from the injury. This clearly shows that the method of this invention does not impair the herbicidal selectivity of the imidates.

The novel method of application, disclosed hereinbefore, not only increases the herbicidal activity of the imidates of Formula I, but it also improves their resistance to reduction in such activity when the plants are subjected to rain shortly after treatment. The results detailed in Table III clearly sustain this conclusion. The data in said table were obtained by making observations at the stated times after low volume treatment of the plants. The crops and weeds used were grown in pots. After the seeds germinated and the seedlings developed, the resulting plants were treated, as stated in the table. This treatment took place about two weeks after the seeds were planted. About 6 hours after the herbicide treatment, the plants, other than the control group, were subjected to a two-inch simulated rain. Thereafter, the plants were observed and such observations were recorded as shown.

wherein

R is alkyl of 1 to 6 carbon atoms, $R^1$ is phenyl, methylphenyl, mono-, di- or trichlorophenyl, methylchlorophenyl or alkoxyphenyl wherein the alkoxy group has up to 5 carbon atoms, Z is methyl or chloro, and Y is oxygen or sulfur, wherein said spray comprises drops of substantially uniform size of up to about 500 microns in diameter.

2. A method according to claim 1 wherein the said liquid imidate is phenyl N-(3,4-dichlorophenyl)propionimidate.

3. A method according to claim 1 wherein the said liquid imidate is 4-methoxyphenyl N-(3,4-dichlorophenyl)propionimidate.

4. A method according to claim 1 wherein the said liquid imidate is applied at the rate of ¼ to 10 pounds per acre.

5. A method according to claim 1 wherein said spray is applied by the use of an airplane.

6. A method according to claim 1 wherein said spray comprises drops in the range of about 100 to 300 microns in diameter.

TABLE III.—EFFECT OF RAIN ON HERBICIDAL ACTIVITY

| | | Percent Injury On— | | | | | | | | | | | |
|---|---|---|---|---|---|---|---|---|---|---|---|---|---|
| | | Crabgrass | | | | | | Barnyard Grass | | | | | |
| | | No Rain | | | Rain | | | No Rain | | | Rain | | |
| | | Days After Application | | | | | | Days After Application | | | | | |
| Compound | Lbs./acre | 3 | 7 | 14 | 3 | 7 | 14 | 3 | 7 | 14 | 3 | 7 | 14 |
| Phenyl N-(3,4-dichlorophenyl)propionimidate [1] | [3] 1.5 | 53 | 83 | 93 | 63 | 89 | 83 | 43 | 93 | 90 | 37 | 77 | 73 |
| | [3] 3.0 | 77 | 100 | 100 | 87 | 99 | 99 | 53 | 96 | 97 | 60 | 95 | 93 |
| 4-methoxyphenyl N-(3,4-dichlorophenyl)propionimidate [1] | [3] 1.5 | | | | | | | 40 | 73 | 67 | 60 | 77 | 77 |
| | [3] 3.0 | | | | | | | 67 | 87 | 100 | 70 | 93 | 100 |
| 3,4-dichloropropionanilide [2] | 1.5 | 50 | 63 | 33 | 30 | 30 | 20 | 3 | 37 | 30 | 3 | 10 | 0 |
| | 3.0 | 53 | 80 | 77 | 30 | 37 | 17 | 17 | 67 | 77 | 0 | 23 | 20 |
| | 6.0 | 63 | 95 | 90 | 53 | 63 | 33 | 20 | 87 | 77 | 7 | 43 | 27 |

| | | Percent Injury On— | | | | | | | | | | | |
|---|---|---|---|---|---|---|---|---|---|---|---|---|---|
| | | Flax | | | | | | Rice | | | | | |
| | | No Rain | | | Rain | | | No Rain | | | Rain | | |
| | | Days After Application | | | | | | Days After Application | | | | | |
| Compound | Lbs./acre | 3 | 7 | 14 | 3 | 7 | 14 | 3 | 7 | 14 | 3 | 7 | 14 |
| Phenyl N-(3,4-dichlorophenyl)propionimidate [1] | [3] 1.5 | 17 | 40 | 37 | 40 | 40 | 33 | 23 | 23 | 20 | 20 | 10 | 20 |
| | [3] 3.0 | 47 | 93 | 97 | 40 | 50 | 73 | 33 | 43 | 43 | 27 | 30 | 27 |
| 4-methoxyphenyl N-(3,4-dichlorophenyl)propionimidate [1] | [3] 1.5 | | | | | | | 17 | 23 | 23 | 23 | 23 | 20 |
| | [3] 3.0 | | | | | | | 20 | 33 | 33 | 30 | 47 | 47 |
| 3,4-dichloropropionanilide [2] | 1.5 | 3 | 7 | 0 | 3 | 3 | 0 | 20 | 30 | 17 | 20 | 20 | 10 |
| | 3.0 | 10 | 23 | 7 | 10 | 13 | 3 | 10 | 27 | 20 | 17 | 20 | 13 |
| | 6.0 | 30 | 33 | 20 | 13 | 27 | 3 | | | | | | |

[1] Applied in undiluted liquid form with equipment suitable for obtaining uniform drop size (about 100 microns).

[2] Applied at the rate of 10 gallons per acre with equipment suitable for obtaining uniform drop size (about 100 microns).

[3] Based on the molar equivalency of 3,4-dichloropropionanilide.

At a level of 1.5 pounds of phenyl N-(3,4-dichlorophenyl)propionimidate per acre, there was a 93% injury of crabgrass (*Digitaria sanguinalis*) after 14 days where there was no exposure to rain. Those plants exposed to the rain showed an injury of 83% after the same length of time. These results are to be compared with those obtained when the plants were treated with the commercial herbicide, 3,4-dichloropropionanilide. At a level of 3 pounds per acre, there was an injury of 77% on the crabgrass after 14 days where the plants were not subjected to the rain. However, those plants subjected to the rain had an injury of only 17% after the same length of time. This is a clear showing that the low volume application of imidates improves the abality to control weeds when they are subjected to a rain shortly after herbicidal treatment.

I claim:

1. A method of controlling plant growth which comprises spraying onto a locus, in which undesired plants are growing, a herbicidally effective amount of an undiluted liquid imidate of the general formula

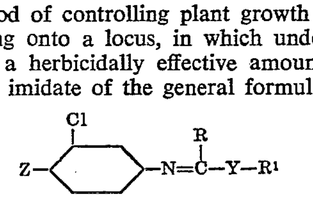

7. A method according to claim 1 directed to the control of barnyard grass.

8. A method according to claim 1 directed to the control of crabgrass.

9. A method according to claim 1 directed to the control of weeds in rice.

References Cited

UNITED STATES PATENTS

| | | | |
|---|---|---|---|
| 2,909,553 | 10/1959 | Stephens | 71—121 X |
| 3,123,460 | 3/1964 | Schafer et al. | 71—98 X |
| 3,180,890 | 4/1965 | Enders et al. | 71—98 X |

OTHER REFERENCES

Ennis, Jr., et al.: "Weeds," vol 11, No. 1, pages 67 to 72, 1963.

LEWIS GOTTS, Primary Examiner

CATHERINE L. MILLS, Assistant Examiner

U.S. Cl. X.R.

71—98